United States Patent
Hills et al.

(10) Patent No.: US 7,313,113 B1
(45) Date of Patent: Dec. 25, 2007

(54) DYNAMIC TRANSMIT POWER CONFIGURATION SYSTEM FOR WIRELESS NETWORK ENVIRONMENTS

(75) Inventors: Alexander H. Hills, Palmer, AK (US); Paul F. Dietrich, Seattle, WA (US); Robert J. Friday, Los Gatos, CA (US)

(73) Assignee: Airespace, Inc., San Jose, CA (US)

( * ) Notice: Subject to any disclaimer, the term of this patent is extended or adjusted under 35 U.S.C. 154(b) by 1027 days.

(21) Appl. No.: 10/407,372

(22) Filed: Apr. 4, 2003

(51) Int. Cl.
*H04Q 7/00* (2006.01)

(52) U.S. Cl. ............... 370/332; 370/330; 370/337; 370/346; 370/347; 370/329; 455/426.1; 455/67.11; 455/423; 455/452.1

(58) Field of Classification Search ............ 370/332, 370/330, 337, 346, 347, 329; 455/426.1, 455/464, 67.11, 67.14, 423; 375/134
See application file for complete search history.

(56) References Cited

U.S. PATENT DOCUMENTS

| | | | |
|---|---|---|---|
| 5,491,692 A | | 2/1996 | Gunner et al. |
| 5,684,860 A | * | 11/1997 | Milani et al. ............ 455/412.1 |
| 5,940,384 A | * | 8/1999 | Carney et al. ............... 370/347 |
| 6,097,956 A | * | 8/2000 | Veeravalli et al. .......... 455/446 |
| 6,104,928 A | * | 8/2000 | Waugh ....................... 455/445 |
| 6,140,964 A | | 10/2000 | Sugiura et al. |
| 6,167,274 A | | 12/2000 | Smith |
| 6,208,629 B1 | * | 3/2001 | Jaszewski et al. .......... 370/329 |
| 6,223,028 B1 | * | 4/2001 | Chang et al. ............... 455/419 |
| 6,240,077 B1 | * | 5/2001 | Vuong et al. ............... 370/330 |
| 6,243,413 B1 | * | 6/2001 | Beukema ................... 375/222 |
| 6,286,038 B1 | | 9/2001 | Reichmeyer et al. |
| 6,338,140 B1 | | 1/2002 | Owens et al. |
| 6,473,038 B2 | | 10/2002 | Patwari et al. |
| 6,664,925 B1 | | 12/2003 | Moore et al. |
| 6,754,488 B1 | | 6/2004 | Won et al. |
| 6,760,318 B1 | * | 7/2004 | Bims ......................... 370/332 |
| 6,760,671 B1 | * | 7/2004 | Batcher et al. ............... 702/60 |
| 6,788,658 B1 | * | 9/2004 | Bims ......................... 370/328 |
| 6,799,047 B1 | | 9/2004 | Bahl et al. |
| 6,810,428 B1 | | 10/2004 | Larsen et al. |
| 6,917,819 B2 | | 7/2005 | Collins |
| 6,925,069 B2 | * | 8/2005 | Koos et al. ................. 370/334 |
| 6,925,070 B2 | | 8/2005 | Proctor, Jr. |
| 6,990,428 B1 | | 1/2006 | Kaiser et al. |
| 7,068,644 B1 | | 6/2006 | McConnell et al. |
| 7,085,576 B2 | * | 8/2006 | Ranganathan ............ 455/456.1 |
| 7,099,669 B2 | * | 8/2006 | Sheffield ..................... 455/446 |
| 7,133,909 B2 | | 11/2006 | Bahl |
| 7,161,914 B2 | * | 1/2007 | Shoaib et al. ............... 370/331 |

(Continued)

OTHER PUBLICATIONS

International Standard, ISO/IEC 8802-11 ANSI/IEEE Std. 802.11, 1999 Edition, Part II: Wireless LAN Medium Access Control (MAC) and Physical Layer (PHY) specifications, pp. 122-137.

(Continued)

*Primary Examiner*—Marceau Milord
(74) *Attorney, Agent, or Firm*—Mark J. Spolyar

(57) ABSTRACT

Methods, apparatuses and systems facilitating the configuration of transmit power and coverage areas corresponding to access points in a wireless network environment. The present invention in one embodiment facilitates the dynamic configuration of coverage boundaries across a plurality of access points, improving the performance of the wireless network environment.

14 Claims, 11 Drawing Sheets

U.S. PATENT DOCUMENTS

| | | |
|---|---|---|
| 2002/0168958 A1 | 11/2002 | Ford et al. |
| 2002/0188723 A1 | 12/2002 | Choi et al. |
| 2002/0194384 A1 | 12/2002 | Habetha |
| 2003/0023746 A1* | 1/2003 | Loguinov ................... 709/235 |
| 2003/0117985 A1 | 6/2003 | Fuji et al. |
| 2003/0188006 A1 | 10/2003 | Bard |
| 2003/0198208 A1* | 10/2003 | Koos et al. ................. 370/338 |
| 2003/0224787 A1 | 12/2003 | Gandolfo |
| 2004/0111607 A1 | 6/2004 | Yellepeddy |
| 2004/0203910 A1 | 10/2004 | Hind et al. |

OTHER PUBLICATIONS

"tcp-masq" Internet citation http://speed.cis.nctu.edu.tw/bandwith/opensource/, Daa Sheet Cisco Aironet 1200 Series Access Point, pp. 1-13, posted Mar. 11, 2002.

* cited by examiner

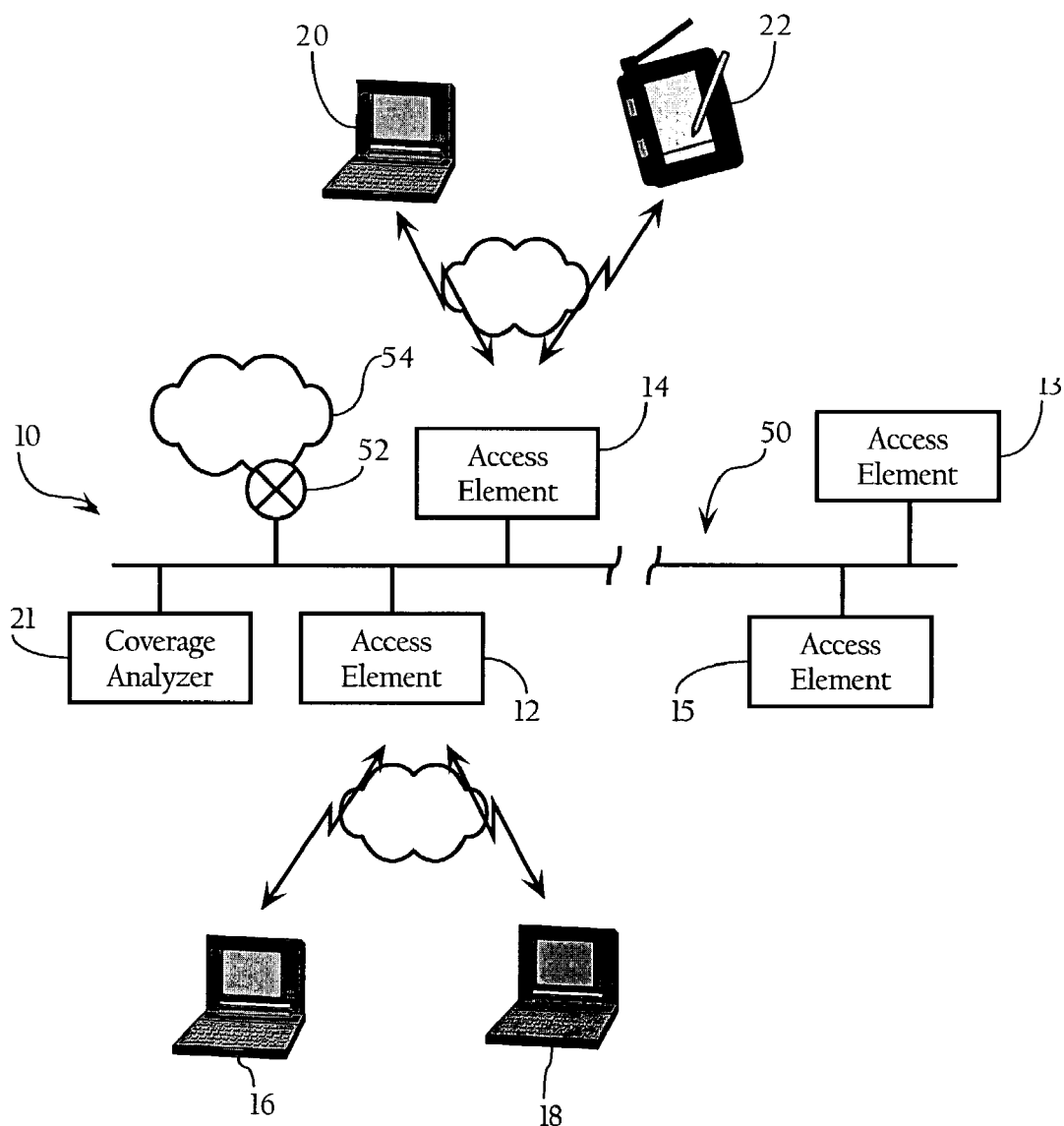
Fig._1

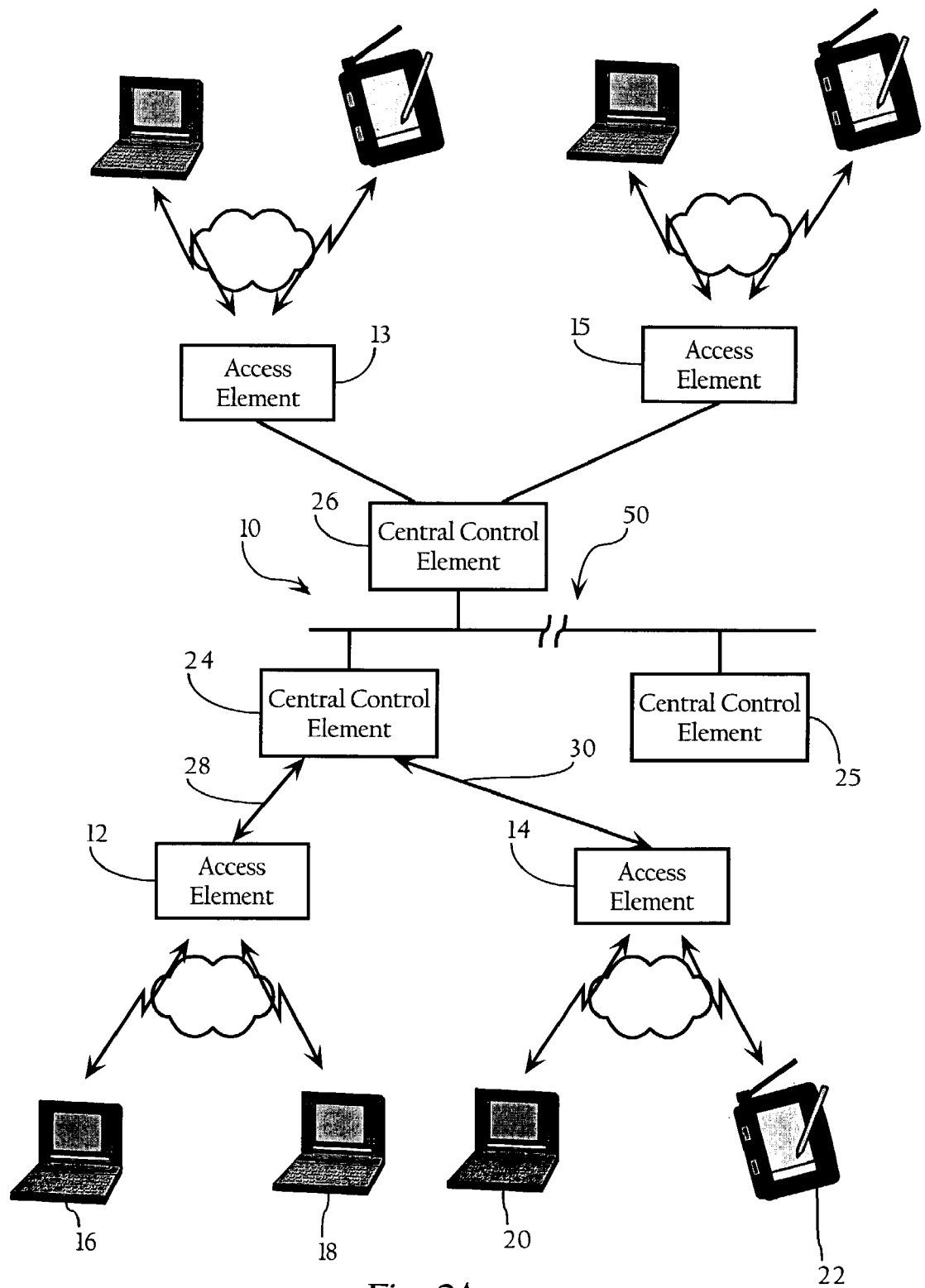
Fig._2A

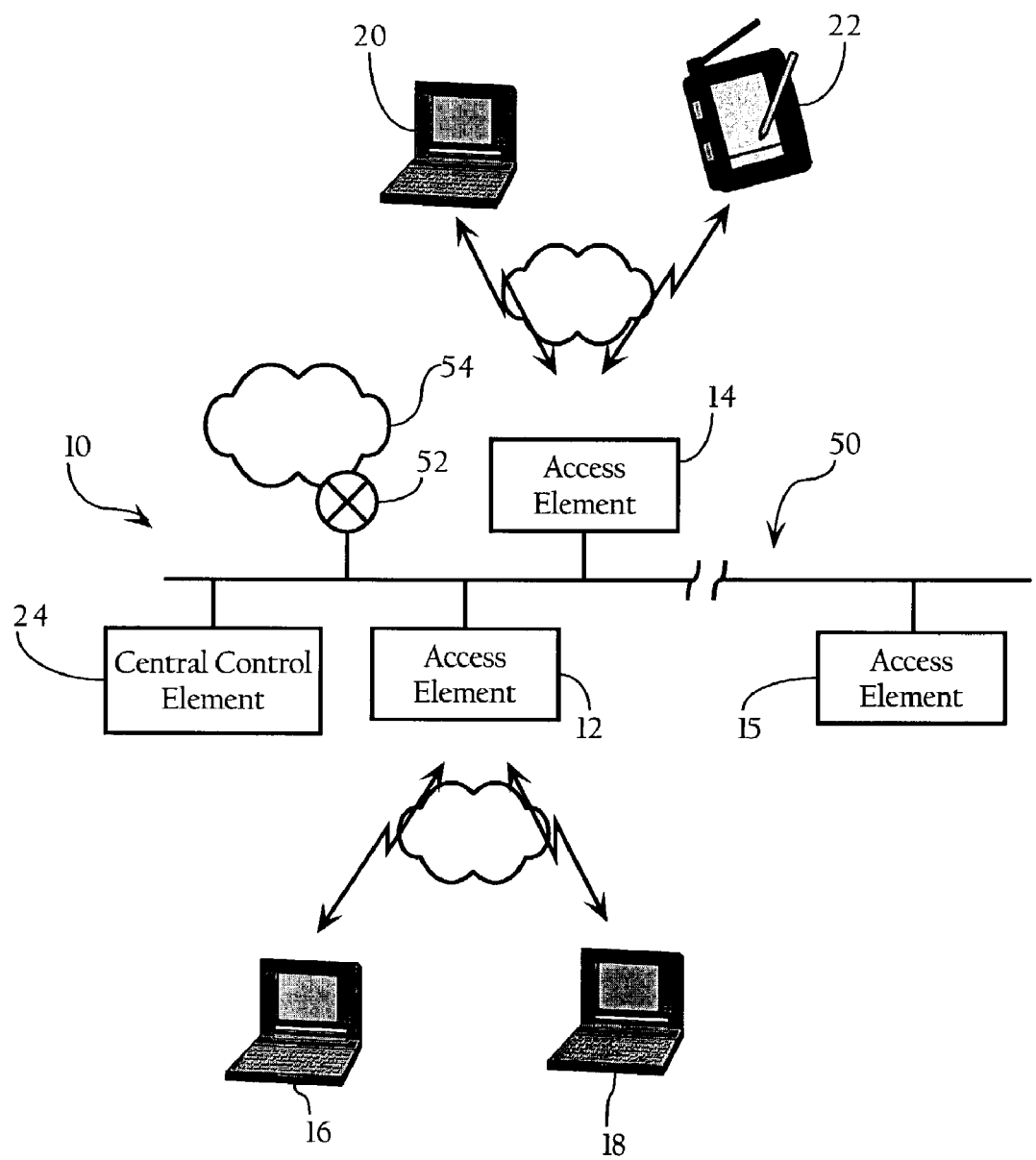
Fig._2B

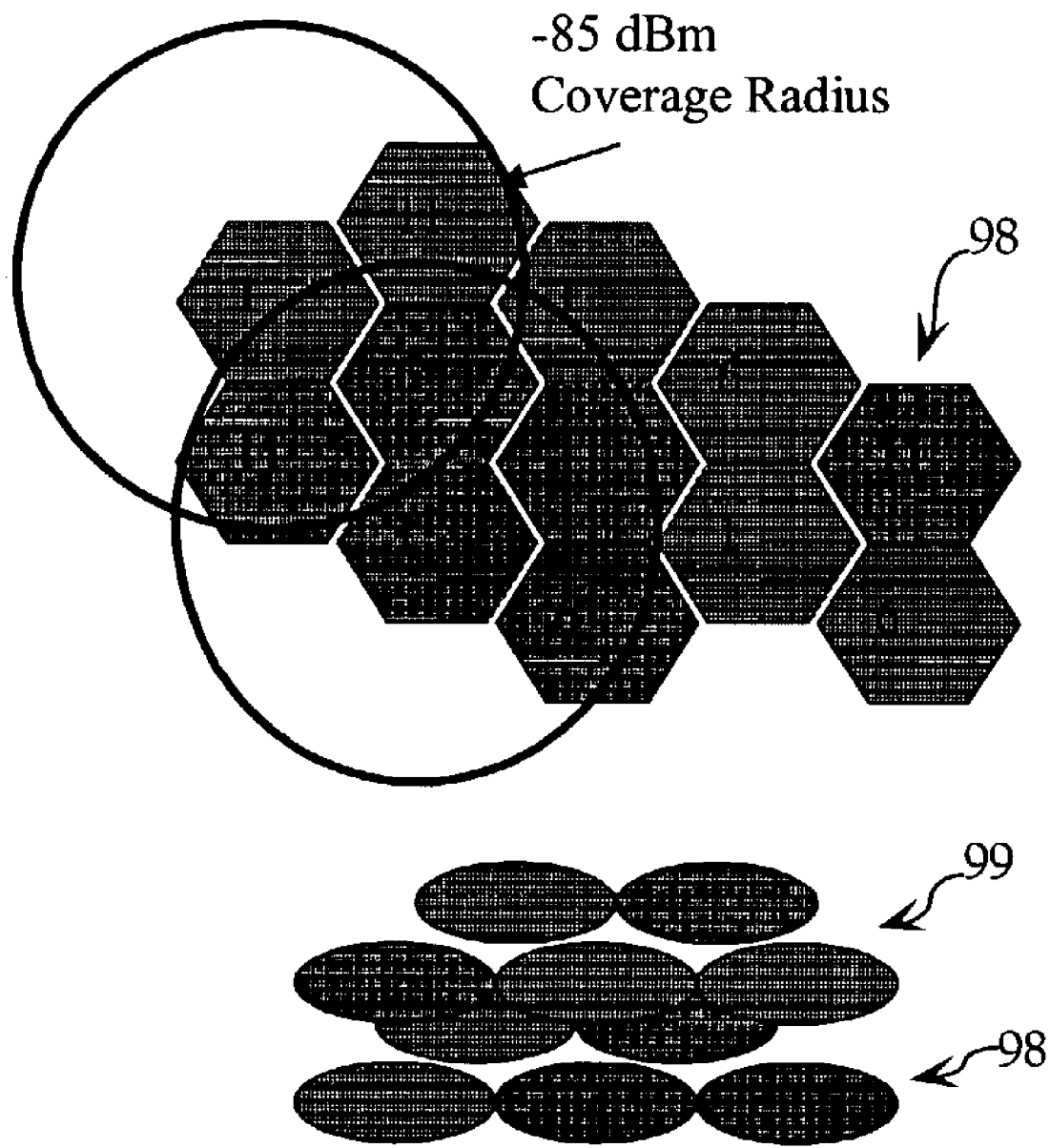
Fig._3

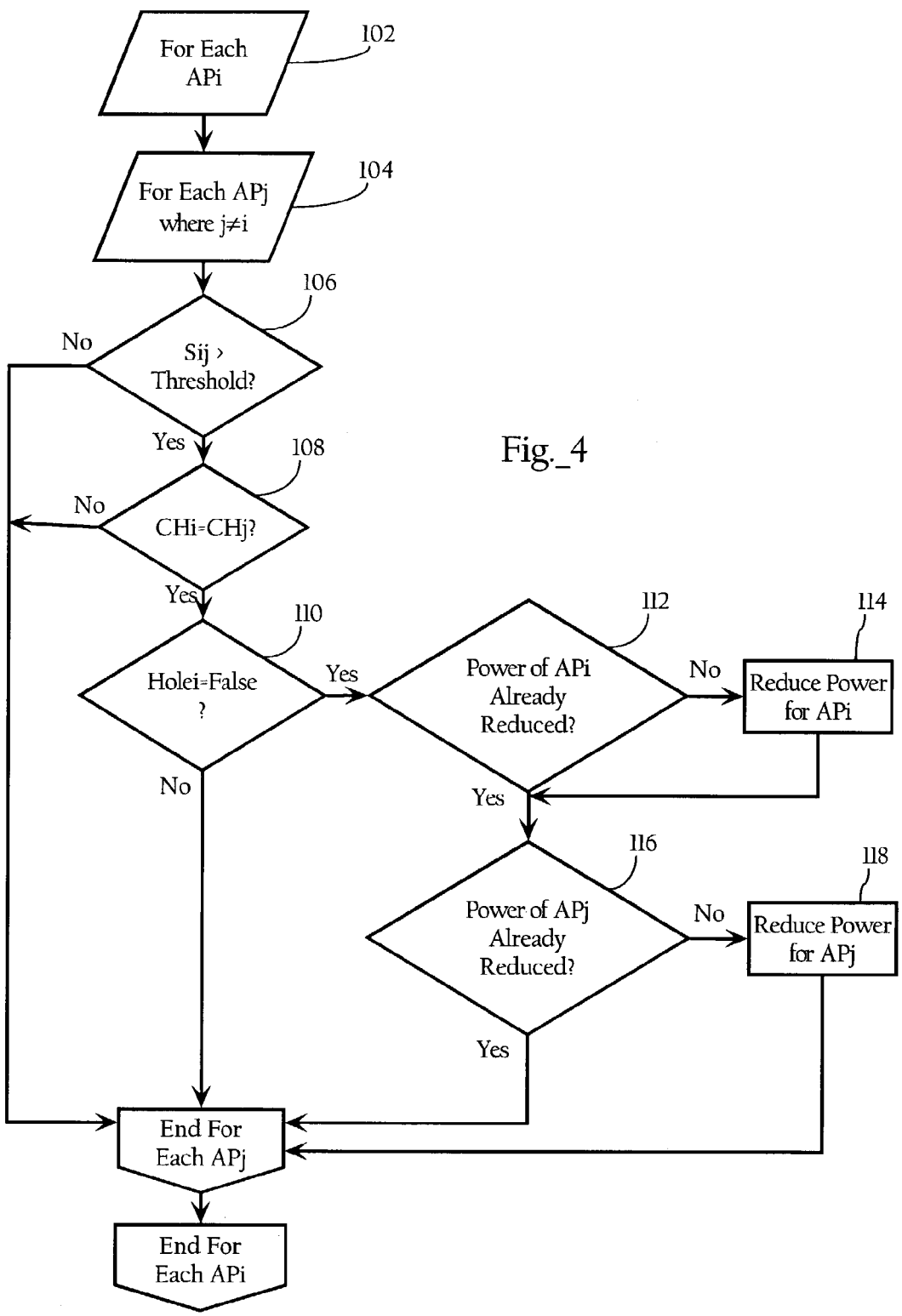
Fig._4

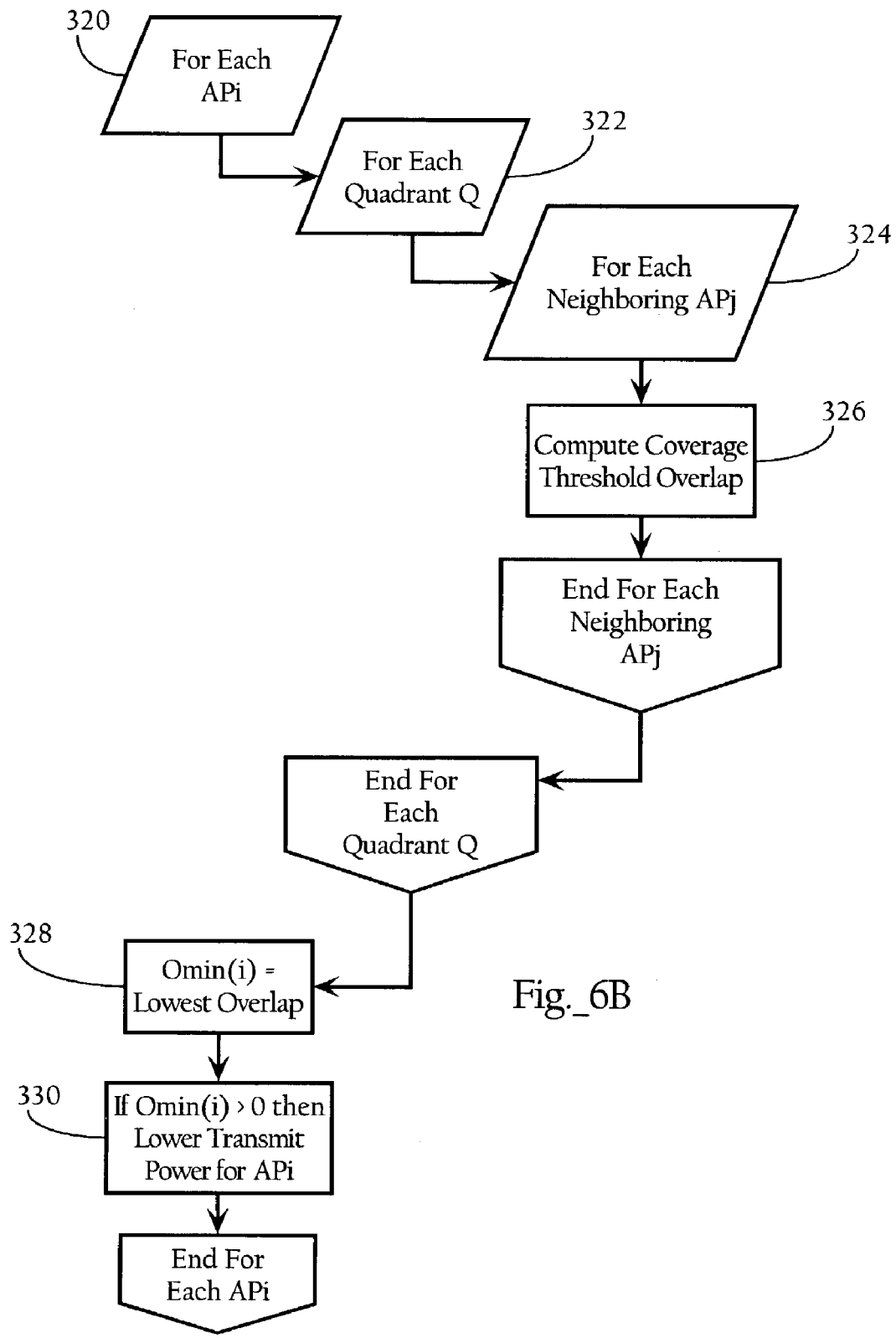
Fig._6B

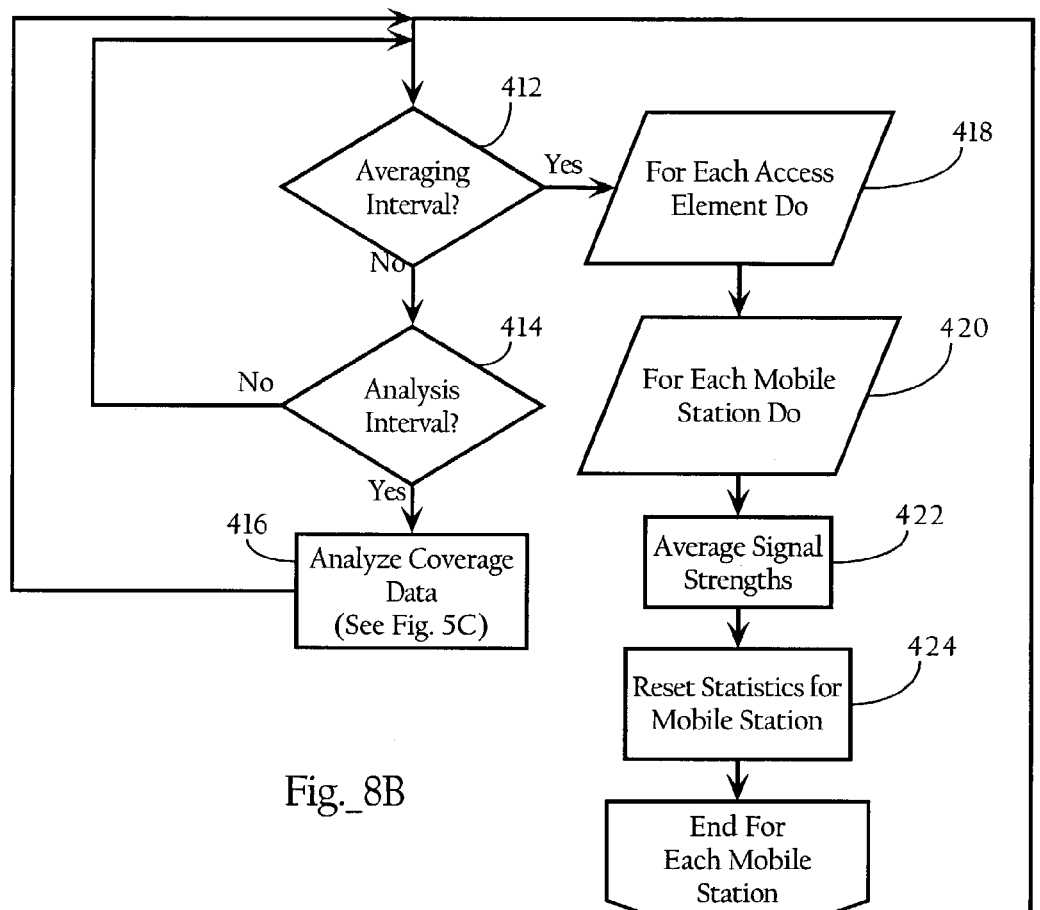
Fig._8B
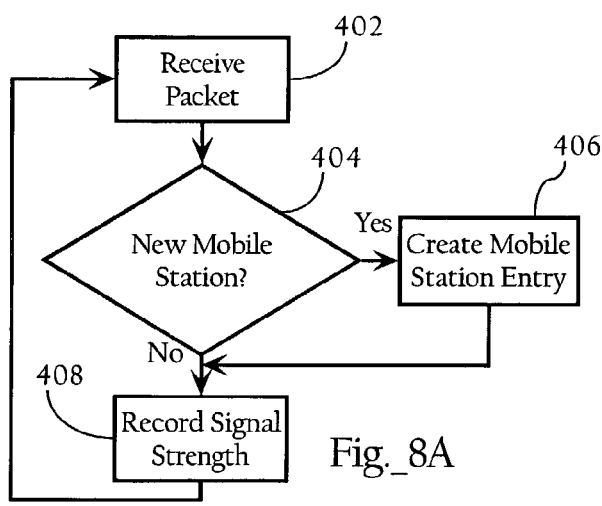
Fig._8A

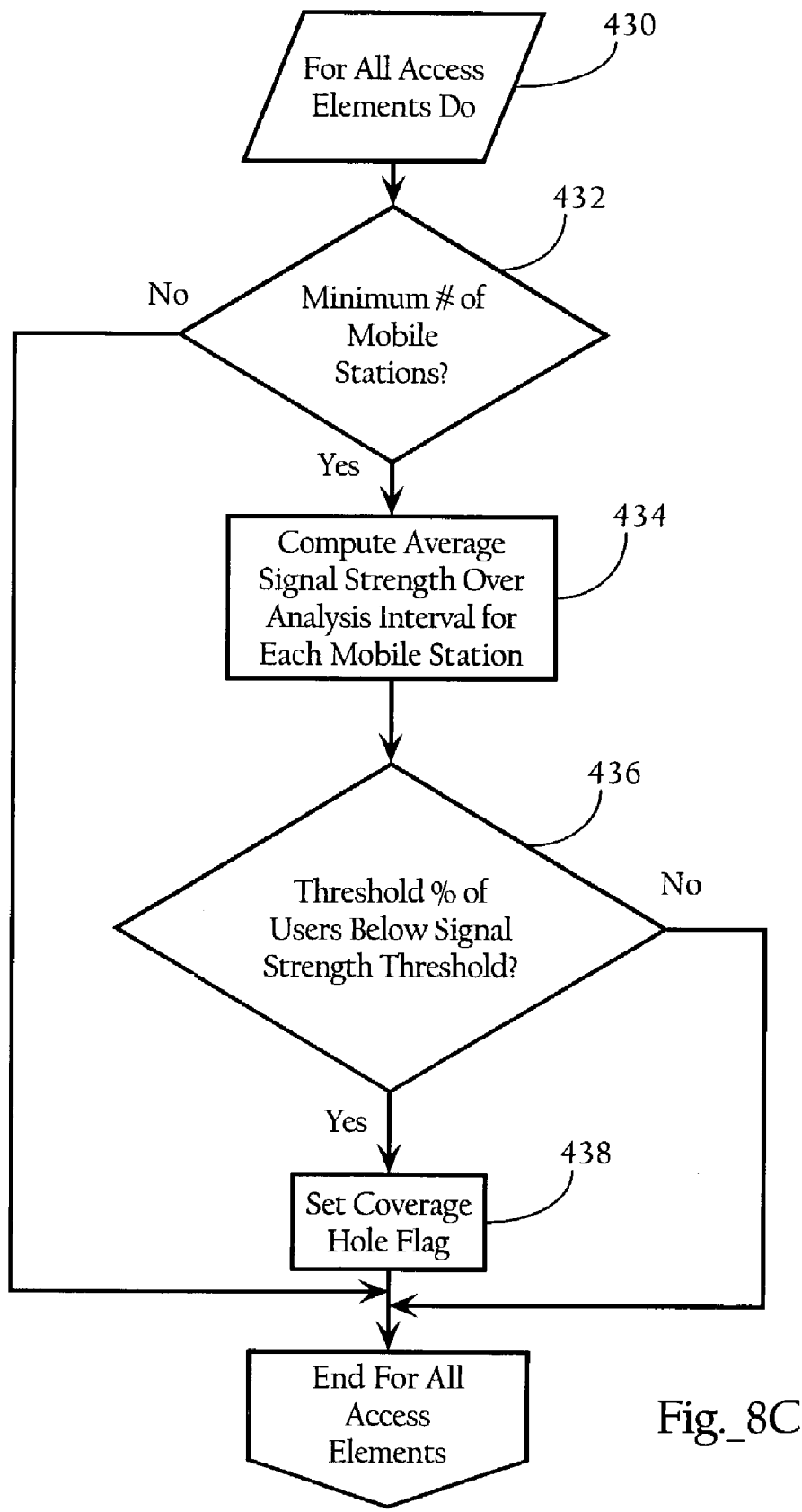
Fig._8C

US 7,313,113 B1

DYNAMIC TRANSMIT POWER CONFIGURATION SYSTEM FOR WIRELESS NETWORK ENVIRONMENTS

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN."

FIELD OF THE INVENTION

The present invention relates to wireless computer networks and, more particularly, to methods, apparatuses and systems facilitating configuration of transmit power in a wireless network environment comprising a plurality of wireless access points.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments become critical to performance and security. To ascertain the coverage and other performance attributes of a wireless network deployment, prior art processes, such as site surveys, typically involve a human tester roaming throughout the wireless network environment with specialized equipment, such as a WLAN tester, that sweeps the wireless coverage area and stores the resulting data for analysis of one or more attributes of the wireless network deployment, such as the coverage provided by each access point, and the signal-to-noise ratios associated with the coverage area of a given access point. Such site surveys, however, are time consuming and expensive. In addition, the analysis of the wireless network environment is performed with data gathered at a single point in time and, therefore, is not responsive to periodic or subsequent changes associated with the wireless network environment (such as deployment of new access points, or intermittent sources of RF interference, etc.).

Defining appropriate coverage boundaries across access points is important to the performance of a wireless network. In an Ethernet LAN (IEEE 802.3), the Carrier Sense Multiple Access with Collision Detection (CSMA/CD) protocol establishes how simultaneous transmissions (packet collisions) are handled. In a WLAN, collision detection in this manner is not possible due to what is known as the "near/far" problem: to detect a collision, a station must be able to transmit and listen at the same time. To account for this difference, the 802.11 protocol uses a slightly different protocol known as Carrier Sense Multiple Access with Collision Avoidance (CSMA/CA)). CSMA/CA attempts to avoid packet collisions by having the transmitting wireless station sense the air for wireless traffic. If there is no activity detected, the transmitting wireless station will wait an additional random period of time. If there still is no activity, the wireless station transmits the data. If the packet is received intact, the receiving station will send an ACK frame that, once received by the original sender, completes the transmission. If the ACK command is not received in a predetermined period of time, the data packet will be resent under the assumption that the original packet experienced a collision. CSMA/CA also handles other interference and radio-wave related problems effectively, but creates considerable overhead. Accordingly, the presence of access points operating on the same or overlapping channels within the vicinity of each other can affect the performance of the enterprise's wireless network.

Given the collision avoidance mechanisms employed in 802.11-compliant wireless networks and the limited number of non-overlapping frequency channels, management and monitoring of the wireless network airspace (for example, to ensure that wireless access points do not interfere with one another) are critical to the performance of the wireless network environment. The administrative or management functionality associated with WLAN networks, however, generally lacks an integrated and/or automated means of adjusting transmit power of access points to optimize WLAN performance. Hand-held scanners, AP startup scans, or full-time scanning devices are the current methods of obtaining data relating to radio coverage within a wireless network environment. Accordingly, many WLANs do not perform at optimum speed due to overlapping coverage areas and channel interference.

In light of the foregoing, a need in the art exists for methods, apparatuses and systems that facilitate dynamic configuration of transmit power in a wireless network environment comprising a plurality of wireless access points. Embodiments of the present invention substantially fulfill this need.

SUMMARY OF THE INVENTION

The present invention provides methods, apparatuses and systems facilitating the configuration of transmit power and coverage areas corresponding to access points in a wireless network environment. The present invention in one embodiment facilitates the dynamic configuration of coverage boundaries across a plurality of access points, improving the performance of the wireless network environment.

DESCRIPTION OF THE DRAWINGS

FIG. 1 is a functional block diagram illustrating a computer network environment including a wireless network system according to an embodiment of the present invention.

FIGS. 2A and 2B are functional block diagrams illustrating wireless network systems according to other embodiments of the present invention.

FIG. 3 illustrates a typical layout of access elements in the 2.4 GHz band using three non-overlapping channels, where the channels assigned to each access element have been optimized in some manner.

FIG. 4 is a flow chart diagram providing a method for computing a set of transmit power levels for a plurality of access elements in a wireless network environment.

FIGS. 6A and 6B are flow chart diagrams illustrating methods that facilitate the computation of transmit power levels for a plurality of access elements, taking location information into account.

FIGS. 8A, 8B and 8C are flow charts illustrating methods, according to embodiments of the present invention, directed to the collection and analysis of coverage data.

DESCRIPTION OF PREFERRED EMBODIMENT(S)

A. Operating Environment

Figure 5:
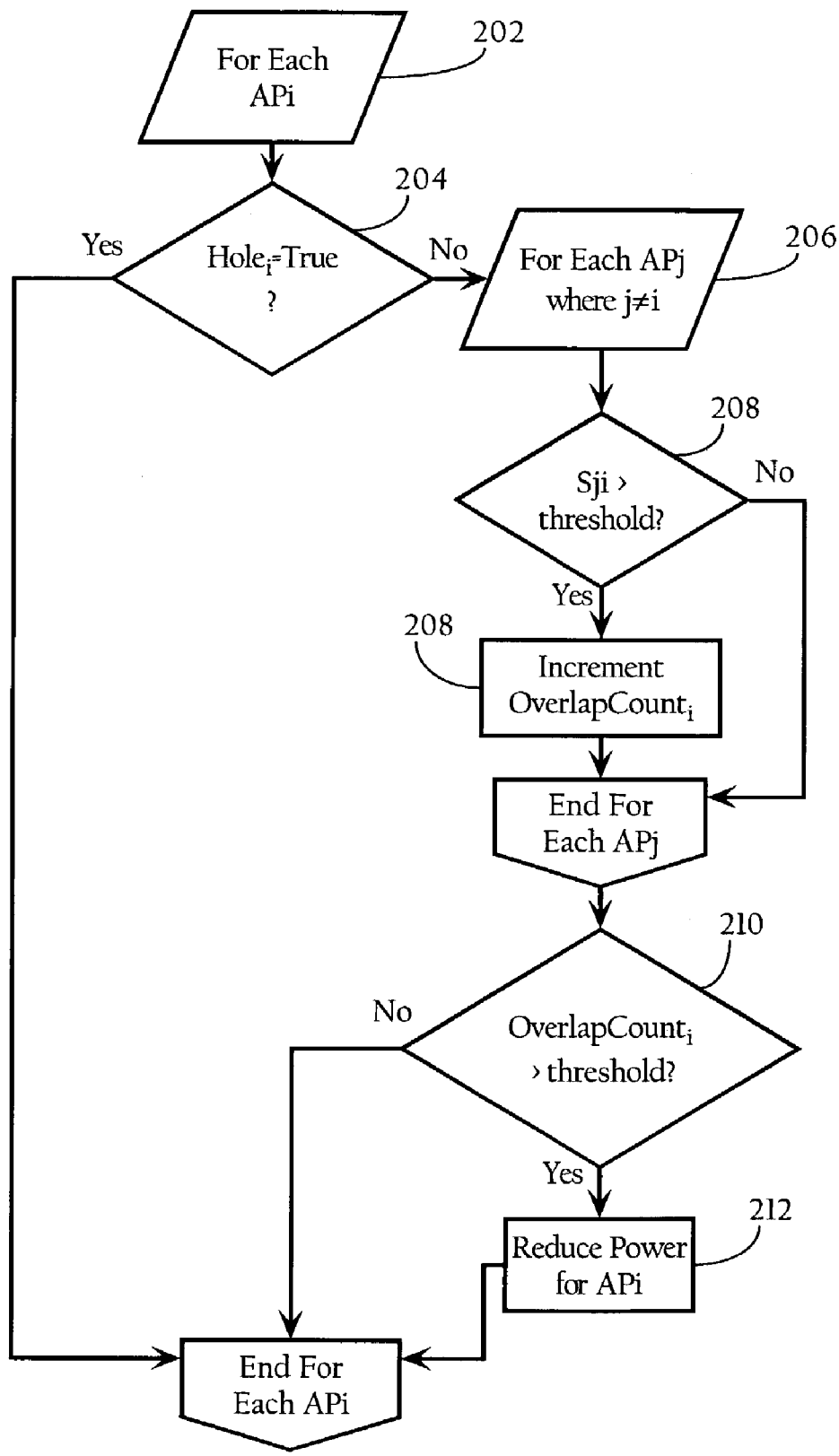
FIG. 5 is a flow chart diagram setting forth an alternative method for computing transmit power levels.

FIG. 1 illustrates a computer network environment including dynamic transmit power configuration functionality according to an embodiment of the present invention. The computer network environment depicted in FIG. 1 includes access elements 12, 13, 14, 15 deployed across wide area network 50 comprising a plurality of local area network segments 10. In one embodiment, the present invention further includes coverage analyzer 21 to receive coverage data from access elements 12, 13, 14, 15 and process the coverage data to compute transmit power levels for the access elements to optimize the performance of the wireless network environment, as described below.

The access elements, such as access elements 12, 14, are operative to establish wireless connections with remote client elements, such as remote client elements 16, 18, 20 and 22. The access elements can operate to bridge wireless traffic between the remote client elements and a wired computer network such as wide area network (WAN) 50, and/or act as hubs to route data between remote client elements within their respective coverage areas. The access elements, in one embodiment, are operative to dynamically recognize new users/remote client elements and wirelessly communicate with one to a plurality of remote client elements. The access elements, in one embodiment, each include a radio frequency transmitter/receiver unit or an infrared transmitter receiver unit, or both. However, any suitable means of wireless communication can be used. The access elements can operate in connection with any suitable wireless communications protocol, including 802.11a and 802.11b. The access elements feature a coverage scanning mode, according to which the access elements monitor their respective coverage areas for wireless traffic associated with neighboring access elements and clients and record data associated with the signal associated with the wireless traffic, such as signal strength. The coverage data can be transmitted to a central management device, such as the coverage analyzer 21 (FIG. 1) or central control element 24 (see description below and FIGS. 2A and 2B) for processing. In one embodiment, the access elements operate in a normal access point mode bridging wireless traffic between WAN 50 and the remote client elements and/or acting as a hub between remote wireless clients. However, at a configurable coverage scanning interval, the access elements switch to a coverage scanning mode according to which they each monitor for wireless traffic for a coverage scanning period. The coverage scanning interval and/or the scanning period can be configurable parameters allowing network administrators to specify the scanning behavior of each access element individually or as a group. For example, a typical coverage scanning period may span 50-60 milliseconds, while a typical interval between scans (scanning interval) may be ten to fifteen seconds. In one embodiment, the access elements can either just disappear (from the perspective of the remote client elements) for the scan period, or use the mechanism in 802.11 for "contention-free periods" to halt the transmissions of the mobile stations before going off channel to perform the scan.

In one embodiment, the access elements each include a scanning daemon that, when invoked at each scanning interval, switches operation of the access element to coverage scan mode. For a scanning period, the scanning daemon monitors for wireless traffic on a given frequency channel and records scan data characterizing any packets detected on the channel. The scanning daemon, in one embodiment, monitors wireless traffic on a given channel and then switches to another frequency channel. The scanning daemon can operate in a variety of manners during the scanning period. For example, the scanning daemon can monitor for wireless traffic on a single frequency channel for the entire scanning period and switch to another frequency channel in a subsequent scanning period. Alternatively, the scanning daemon can scan a plurality of frequency channels during a given scan period. In addition, the scanning daemon can be configured to transmit the coverage scan data directly to a central repository, such as coverage analyzer 21, or store it locally for later transmission in response to a request from the coverage analyzer 21.

During the scan, the scanning daemon monitors for packets on a given channel, parsing the packets and recording information about the packets in a data structure, such as a table. 802.11 wireless network environments feature a number of different frame or packet types and sub-types, such as management frames (e.g., association requests and responses), control frames (e.g., request-to-send frames, and acknowledgments), and data frames. Every 802.11 frame includes a frame control field that allows for resolution of frame type, as well as whether the frame is sourced from a client or an access element. In addition, 802.11 frames also include the MAC addresses of the source and destination stations. Certain 802.11 frames also include the Service Set Identifier (SSID) associated with the access point or element, such as beacon frames, probe responses and association requests. In one embodiment, the scanning daemon is configured to record data only for frames transmitted by other access elements. For example, the scanning daemon can be configured to record data for detected beacon frames, probe responses, authentication responses, and data frames transmitted by access elements. In one embodiment, the scanning daemon can parse the information in the detected packets and construct a table or other data structure including one or more scan data fields. The coverage scan data fields can include MAC address, SSID, frequency channel and any other information available from 802.11 frame headers, as well as an indicator of the strength of the detected signal associated with the packet (see below). In one embodiment, the scanning daemon can record information on all packets detected during a scan, or summarize the information to eliminate redundant information.

The access elements, such as access elements 12, 14, include functionality allowing for detection of the strength of the received signals. For example, the IEEE 802.11 standard defines a mechanism by which RF energy is to be measured by the circuitry (e.g., chip set) on a wireless network adapter or interface card. The 802.11 protocol specifies an optional parameter, the receive signal strength indicator (RSSI). This parameter is a measure by the PHY sub-layer of the energy observed at the antenna used to receive the current packet. RSSI is measured between the beginning of the start frame delimiter (SFD) and the end of the PLCP header error check (HEC). This numeric value is an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. The access elements 12, 14 include the detected signal strength value associated with a packet in the coverage scan table. In one embodiment, the scan data fields can also include a time stamp indicating when the packet was detected.

Coverage analyzer 21, in one embodiment, is a network device that receives coverage scan data from the access elements and processes the coverage scan data, in one embodiment, to compute an optimal set of transmit power levels for the access elements. In one embodiment, the functionality of coverage analyzer 21 can be incorporated into a wireless network management platform or appliance. As discussed below, the functionality of coverage analyzer may also be incorporated into one or more central control elements 24, 26 as discussed more fully below. In one embodiment, coverage analyzer 21 includes an access point table storing information relating to known access elements. In one embodiment, the access point table includes an access element identifier field, and a current transmit power field. In 802.11 wireless network environments, the access element identifier is the MAC address corresponding to a given access element, while the service set identifier is the SSID contained in certain management frames, such as beacon frames, probe response frames, and association request frames. The access point table can be manually configured by a network administrator with knowledge of the MAC address and the SSID of the access elements. In another embodiment, the access point table can be automatically populated using layer 2 and/or layer 3 discover mechanisms. In one embodiment, the access elements can be configured to automatically transmit the coverage scan data to coverage analyzer 21 after each coverage scan. In another embodiment, the access elements can store the coverage scan data and transmit them in response to a request from coverage analyzer 21. In addition, coverage analyzer 21 can be configured to execute the coverage analysis functionality at regular, configurable intervals, or on demand. In one embodiment, coverage analyzer 21 maintains, for each access element, a separate table or other data structure for the received coverage scan data. In one embodiment, coverage analyzer 21 can summarize the coverage scan data, for example, by averaging the detected signal strength values associated with packets transmitted from a given access element.

Other system architectures are possible. FIG. 2A illustrates a computer network environment including an alternative wireless network system architecture. For example, the coverage detection and configuration functionality according to the present invention can be implemented within the context of a hierarchical wireless network infrastructure. U.S. patent application Ser. No. 10/155,938 discloses a wireless network system having a hierarchical architecture for the management of multiple access elements by a central control element. FIG. 2A illustrates a hierarchical wireless networking system according to an embodiment of the present invention, including the following components: access elements 12-15 for wireless communication with remote client elements 16, 18, 20, 22, central control elements 24, 26, and means for communication between the access elements and the central control elements, typically direct line access 28, 30, but potentially a wireless backbone, fiber or other reliable link. In another embodiment, access elements 12, 14 are directly connected to LAN 10 or a virtual local area network (VLAN) for communication with central control element 24.

The access elements 12-15 are coupled via communication means using a wireless local area network (WLAN) protocol (e.g., IEEE 802.11a, 802.11b, etc.) to the client remote elements 16, 18, 20, 22. The communications means 28, 30 between the access elements 12, 14 and the central control element 24 is typically an Ethernet network, but it could be anything else which is appropriate to the environment. As described in U.S. patent application Ser. No. 10/155,938, the access elements 12, 14 and the central control element 24 tunnel network traffic associated with corresponding remote client elements 16, 18; 20, 22 via direct access lines 28 and 30, respectively. The access elements 12, 14 and central control element 24, in another embodiment, may tunnel wireless traffic over a LAN or virtual LAN. Central control element 24 is also operative to bridge the network traffic between the remote client elements 16, 18; 20, 22 transmitted through the tunnel with corresponding access elements 12, 14.

As described in the above-identified patent application, central control element 24 operates to perform link layer management functions, such as authentication and association on behalf of access elements 12, 14. For example, the central control element 24 provides processing to dynamically configure a wireless Local Area Network of a system according to the invention while the access elements 12, 14 provide the acknowledgement of communications with the client remote elements 16, 18, 20, 22. The central control element 24 may for example process the wireless LAN network management messages, load control, channel control, and handoff. Among the network management messages are authentication requests of the client wireless access elements 12, 14 and association requests of the client wireless access elements 12, 14. The network management messages are passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control element 26 and associated access elements 13, 15 operate in a similar or identical manner.

According to one embodiment, the central control elements 24, 26 may each incorporate the functionality of coverage analyzer 21 (see above) to receive coverage scan data from the access elements to which they are associated and process the coverage scan data to compute an transmit power levels for the access elements. In an exemplary deployment, central control element 24 may be connected to a set of access elements installed on one floor of an enterprise facility, while central control element 26 may be operably connected to a set of access elements installed on a different floor of the facility. Access elements 12-15 are configured, as discussed above, to switch to a scan mode for a scanning period at regular scanning intervals, and transmit coverage scan data to the corresponding central control elements. In one embodiment, the central control elements 24, 26 are configured to automatically discover the access elements to which they are connected by various layer 2 and 3 discovery mechanisms, and populate the access point table. Central control elements 24, 26, in one embodiment, act independently with respect to each other; that is, for deployments where there is no overlap in coverage areas among the access elements 12-15, central control elements 24, 26 need not share access element information. However, in other deployments where there is coverage overlap, sharing of coverage scan and configuration information may be desirable.

In one embodiment, one of central control elements 24, 26 can be configured to perform the coverage analysis and configuration functionality described herein on behalf of the entire system. In one embodiment, central control elements 24, 26 can be configured to automatically discover each other over LAN 10 or WAN 50 using layer 2 and/or layer 3 discovery mechanisms as well. The central control elements 24, 26 can also be manually configured with knowledge of each other. Since access elements 13, 15 may be detected during a scan by either access elements 12 or 14, the central control elements exchange access point table information. In the example of FIG. 2A, central control element 24 would provide to central control element 26 the MAC addresses and SSIDs associated with access elements 12, 14. Similarly, central control element 26 would provide to central control element 24 the MAC addresses and SSIDs associated with access element 13, 15. Each central control element 24, 26 adds the information to the access point tables to allow for proper identification of the access elements. Such exchanges of information can be performed at periodic intervals or in response to updates to the access point table.

In addition, as FIG. 2B illustrates yet other system architectures are possible. According to another embodiment, central control element 24 (as well as other central control elements not shown) can communicate with access elements 12, 14 over local area network segment 10. In addition, using a virtual local area network (VLAN) technology and protocols, central control element 24 may also communicate with access element 15 over WAN 50. Suitable VLAN protocols include the IEEE 802.1Q (VLAN tagging) protocol or any other protocol allowing for a logic or virtual link layer connection between the central control element and the access elements. According to this deployment architecture, wireless traffic associated with remote client elements 16, 18; 20, 22, according to one embodiment, can be tunneled between the central control element 24 and the access elements 12, 14. In another embodiment, access elements 12, 14 can operate to directly bridge network traffic between remote client elements 16, 18; 20, 22 and WAN 50, while tunneling network management messages, such as authentication and association requests from remote client elements to central control element 24 as discussed above.

Other coverage data collection schemes are possible. For example, the access elements can be configured to broadcast management packets at periodic intervals on all available frequency channels for detection by neighboring access elements. In one embodiment, each access element can be configured with knowledge of neighboring access elements and address such packets directly to them. This configuration ensures that coverage data exists for access elements that would otherwise be inactive. The access elements, detecting the broadcasted packets, can be configured to store the MAC address of the broadcasting access element, the signal strength associated with the packet, and optionally a time stamp. Furthermore, the access elements need not go "off channel" to monitor for wireless traffic associated with its neighboring access elements, and can instead receive the packets in a normal access point mode configuration. In addition to sending directly to other access elements, the packets can be sent to a broadcast address or multicast address, where no knowledge of the other access elements is necessary.

B. Dynamic Transmit Power Commutations

The dynamic transmit power functionality according to the present invention can operate in a variety of manners to achieve different objectives. As discussed below, the dynamic transmit power functionality can operate with or without location information for the access elements. In addition, the dynamic transmit power functionality can operate to minimize the coverage overlap of access points on the same channel, or minimize the converge overlap of access points regardless of channel. Still further, the dynamic transmit power functionality, according to one embodiment of the present invention, operates in conjunction with coverage hole detection functionality, described below, to prevent the transmit power of an access element from being reduced where client data indicates that the signal strength of the access element is below a desired performance level.

B1. Coverage Hole Detection Functionality

As discussed above, the access elements, such as access elements 12, 14, include functionality allowing for detection of the strength of the signal received from client remote elements and neighboring access elements. Other attributes of the signal can be used in combination with received signal strength or as an alternative. For example, the detected Signal-to-Noise Ratio (SNR) during packet transmission can be used in determining the existence of coverage holes in the wireless network environment. Again, many chip sets include functionality and corresponding APIs to allow for a determination of SNRs associated with packets received from client remote elements. In one embodiment, access elements 12, 14 include the detected signal strength and/or SNR value associated with a packet in the physical layer information (PHY) field of the encapsulated 802.11 packet, as described in U.S. patent application Ser. No. 10/155,938.

Figure 7:
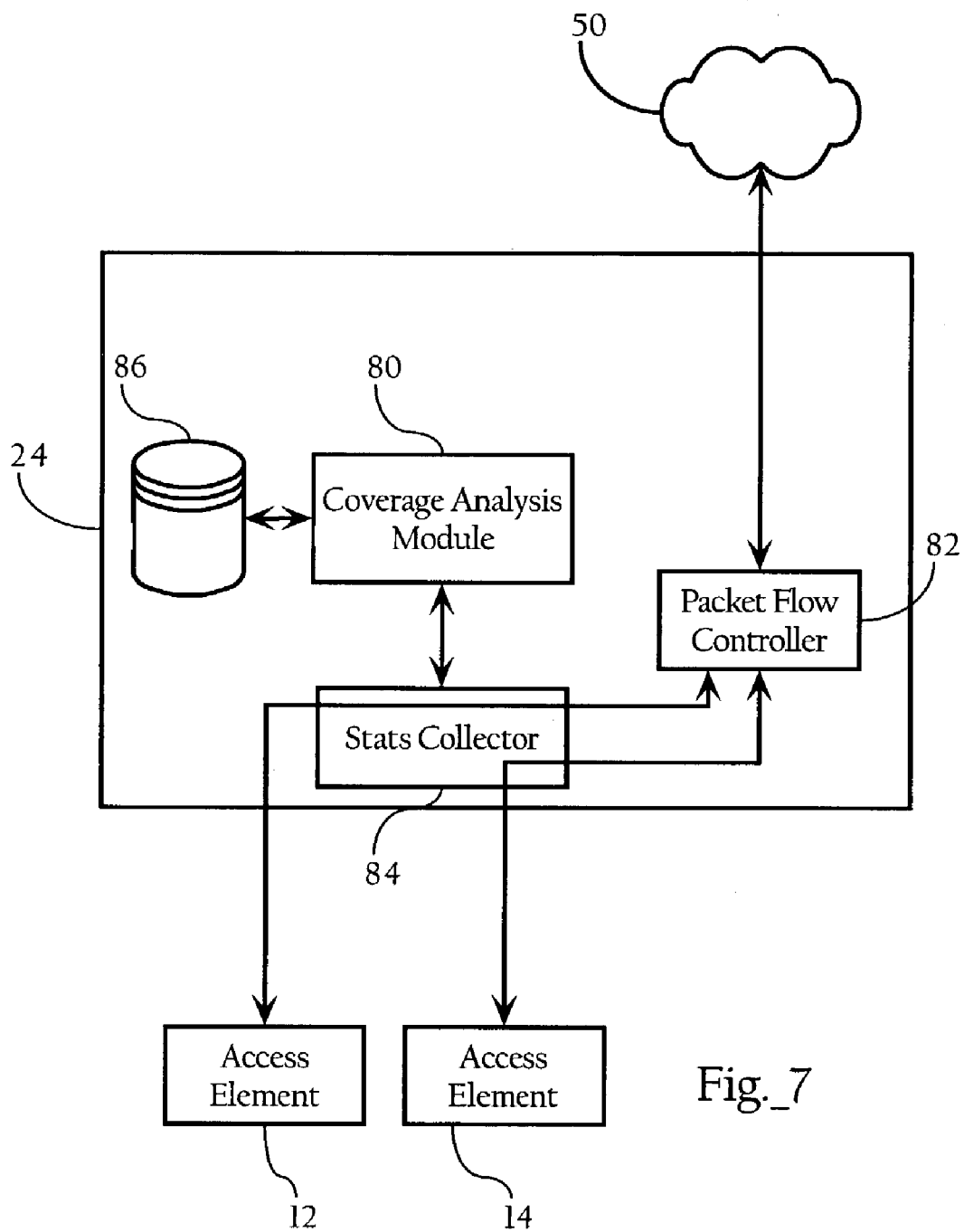
FIG. 7 is a functional block diagram illustrating the functional elements associated with the coverage hole detection mechanism according to an embodiment of the present invention and the packet flow across these functional elements.

FIG. 7 is a functional block diagram illustrating the functional elements associated with the coverage hole detection mechanism according to an embodiment of the present invention. As FIG. 7 illustrates, central control element 24 includes coverage analysis module 80, stats collector 84, database 86 and packet controller 82. Packet flow controller 82 routes the data frames to and from the remote wireless clients through the access elements, and handles other tasks associated with operation of the wireless network environment, such as authentication and association (see above). As discussed more fully below, stats collector 84 maintains one or more statistics characterizing various aspects of the wireless network environment based on an examination of the information contained in the packets traversing central control element 24. Coverage analysis module 80, in one embodiment, is operative to periodically store the statistic(s) maintained by stats collector 84 in database 86 in association with a time stamp. Coverage analysis module 80 is further operative to analyze the data over a configurable time interval to detect a coverage hole associated with a given access element.

FIG. 7 also shows the packet flow path according to an embodiment of the present invention. In one embodiment, stats collector 84 maintains a histogram of signal strength on a per-access-element basis based on the signal strength information (e.g., SNR, RSSI, dBm) contained in the packet headers traversing central control element 24. For example, the received signal strength (dBm) of a packet received by an access element is recorded in a corresponding histogram having a range of −100 dBm to −10 dBm in increments of 1 dB bins. Of course, the exact range and number of bins may depend on the physical properties of the wireless network protocol and are also matters of engineering choice. Accordingly, the exact ranges and number of bins set forth herein are not intended to limit the scope of the claimed invention. As the data structure set forth below indicates, stats collector 84 maintains other statistics associated with the signal strength histogram for each access element, such as number of samples, number of unique MAC addresses, etc. As discussed above, coverage analysis module 80 is operative to store the statistics in association with a time stamp in database 86 and reset the statistic values maintained by stats collector 84.

BSNRadioHistFil(x)=. . .
The RSSI histogram struct:
typedef struct {
int NumberOfSamples;
int NumberOfUniqueMACIDs;
time TimeOfFirstSample;
time TimeOfLastSample;
int RadioHistogram[100];
int ClientHistogram[100];
}

As one skilled in the art will recognize, the received signal strength values maintained by stats collector 84 reflect the strength of the signal transmitted from the remote client element to the access element. The histogram can be shifted by the equation below to obtain an estimate of the signal strength of the access elements 12, 14 relative to the remote client elements:

$$ClientHistogram(x)=RadioHistogram(x)+RadioEIRP-ClientEIRP),$$

where RadioHistgram(x) is a histogram of signal strength maintained by stats collector 84 for a given access element, RadioEIRP is the transmit power (dBm) of the access element, ClientEIRP is the average transmit power (dBm) of the remote client elements, as detected by the packets traversing central control element 24. In one embodiment, the client transmit power, ClientEIRP, is obtained by scanning the MAC addresses of the remote client elements against a table or other database that contains the transmit powers associated with different wireless adapters by vendor as identified by the first N bits of the MAC address. In another embodiment, stats collector 84 is operative to perform the conversion as part of the statistics collection process. For example, stats collector 84 may be operative to poll the device/transmit power table using the MAC address of the remote client element to determine the ClientEIRP value and then estimate the signal strength of the access element based on the RadioEIRP, ClientEIRP and the received signal strength indicator. To ensure that a single remote client element involved in a large data flow, such as streaming video, is not over represented in the histogram, coverage analysis module 80, in one embodiment, applies a filter to the histogram, RadioHistogram, before estimating the Client Histogram. Of course, other embodiments of the present invention can use the RadioHistogram values, rather than estimating the Client Histogram.

After the client histogram for a given access element is computer, coverage analysis module 80 then determines whether the level of coverage reflected by the histogram meets a minimum coverage profile configured by a network administrator. In one embodiment, the minimum coverage profile specifies what percentage of the histogram samples should be above a specified threshold level (e.g., received signal strength, SNR, etc.). For example, a network administrator may specify that 95% of the estimated client samples should be above −70 dBm.

The results of the analysis described above, in one embodiment, are stored and used in computing transmit powers for the access elements as described below, can be used in a variety of ways.

In another embodiment, coverage analysis as to each access element is based on a configurable percentage of mobile stations below a configurable threshold signal strength level, as opposed to the sample-based methodology discussed above. Stats collector 84 maintains, for each access element, a list of identifiers (e.g., MAC addresses) of the remote client elements that have established wireless connections. Stats collector 84, as to each mobile station identifier in the list, maintains the detect signal strength values associated with each packet corresponding to the remote client elements. FIG. 8A illustrates a method directed to the collection of signal strength data on a packet-by-packet basis for each mobile station. As FIG. 8A illustrates, stats collector 84, when it receives a data packet (402), determines whether the packet is associated with a new mobile station (404) and, if so, creates a new mobile station entry including the MAC address or other identifier corresponding to the mobile station (406). Stats collector 84 then records the signal strength value contained in the encapsulating packet header in associated with the corresponding mobile station identifier (408). A separate process scans the list of mobile station identifiers and deletes the entries where no activity has been detected after a threshold period of time as to that access element.

As FIG. 8B indicates, stats collector 84 maintains the signal strength values for each packet traversing it for an averaging interval or window, at which point the coverage analysis module 80 polls the stats collector 84 for the collected data and then filters the signal strengths over the averaging interval. In one embodiment, coverage analysis module 80, at a configurable averaging interval or window (e.g., 1 minute, etc.) (412), computes the average signal strength from the values collected during examination of each packet by stats collector 84 (422). In one embodiment, coverage analysis module 80 stores the computer values in a persistent data store in association with a time stamp. As FIG. 8B shows, coverage analysis module 80 performs this computation for each access element (418) and each mobile station (420). In one embodiment, coverage analysis module 80 resets the counts maintained by stats collector 84 as it traverses the mobile stations (424).

As FIG. 8B also shows, stats collector 84, at a configurable analysis interval (e.g., 3 minutes) (414), then analyzes the filtered coverage data (416). FIG. 8C illustrates a method, according to an embodiment of the present invention, directed to the analysis of coverage data. Coverage analysis module 80, as to each access element (430), first determines whether a minimum number of mobile stations have established wireless connections with the access element (432). If so, coverage analysis module 80 computes the average signal strength over the analysis interval for each mobile station (434). If a configurable threshold percentage of mobile stations associated with an average signal strength is less than a threshold level (436), coverage analysis module 80, in one embodiment, sets a flag in a data structure associated with the access element (438).

Of course, other embodiments and system architectures are possible. For example, the signal strength histograms can be maintained at access elements 12, 14 and retrieved on a periodic basis by central control element 24 via Simple Network Management Protocols (SNMP) or other query methods. In addition, the connections between central control element 24 and the access elements 12, 14 need not be through direct access lines 28, 30 respectively. A variety of system architectures are possible. For example, central control element 24 and the access elements can communicate over a Local Area Network, or over a VLAN in a Wide Area Network (WAN). In addition, central control element 24 and the access elements associated therewith can be deployed across a Wide Area Network, such as the Internet. Furthermore, in the embodiment described above, central control element 24 bridges the wireless traffic between the remote client elements and network 50. In other embodiments, the access elements 12, 14 bridge the wireless traffic between the remote client elements and network 50. In addition, the present invention can also be applied to WLAN architectures beyond the hierarchical WLAN architecture described above. For example, in another embodiment, the coverage analysis functionality described herein can be implemented within the context of a single, autonomous access point, which can be configured to communicate with a central management platform via SNMP or other protocols.

B.2. Dynamic Transmit Power Without Location Information

FIG. 3 illustrates a typical layout of access elements in the 2.4 GHz band using three non-overlapping channels, where the channels assigned to each access element have been optimized in some manner. As FIG. 3 illustrates, the access elements are spaced relative to each other in the x, y and z axis dimensions, such as deployments in separate floors or levels 98, 99 of an office building. In one embodiment, the dynamic transmit power functionality is configured to minimize the coverage overlap of access elements on the same channel. It checks for neighboring access elements on the same channel whose signals are detected above a given threshold. In one embodiment, this algorithm works in conjunction with coverage hole detection functionality to ensure that a reduction in power will not adversely affect the performance of a given access element (see below). The dynamic transmit power functionality, in one embodiment, detects the coverage overlap between access elements that have the same channel assignment and reduces the power of each overlapping access element by an equal amount to achieve a desired intersection at a given coverage threshold level (e.g., −85 dBm) between the access elements. In one embodiment, however, before lowering the transmit power, a coverage analyzer ensures that there are no coverage holes associated with the access elements on which power is to be reduced.

As discussed above, the dynamic transmit power functionality has access to a database including the signal strength values corresponding to neighboring access elements as detected by each access element. In one embodiment, the database maintains a list or table for each access element of the detected access element(s) and a signal strength value associated with each detected access element. In one embodiment, coverage analyzer 21 sorts each list or table by largest coverage overlap (i.e., signal strength value). In another embodiment, coverage analyzer 21 assembles a two-dimensional matrix including the detected signal strengths among the access elements. As discussed above, the signal strength values in the coverage matrix can be the average signal strength values corresponding to the packets transmitted by the access elements.

FIG. 4 illustrates a method directed to minimizing the coverage overlaps of access elements operating on the same channel. As discussed above, in one embodiment, coverage analyzer 21 maintains an i×j matrix of the signal strengths of the access elements as detected by all other access elements, where i=j and i equals the number of access elements in a given group of access elements. Accordingly, there are no values in the matrix where i equals j. In addition, many values in the matrix may be null or zero values as well, as many access elements may not detect the signals of all other access elements within a group. A group may be all access elements associated with a given central control element 24, or all access elements in a given physical location, such as a floor of a building.

As FIG. 4 illustrates, in one embodiment, coverage analyzer 21, for each access element ($AP_i$) (102), compares the signal strength detected by the access element from all other access elements ($AP_j$) in the matrix (104) against a coverage threshold. For example, in one embodiment, coverage analyzer 21 determines whether the signal strength, $S_{ij}$, detected by $AP_i$ is greater than a coverage threshold of −85 dBm (106). As FIG. 4 illustrates, coverage analyzer 21 also determines whether $AP_i$ and $AP_j$ operate on the same channel (108) and whether a coverage hole has been detected as to $AP_i$ (110). Assuming all conditions are met, coverage analyzer 21 then reduces the transmit power, or generates an instruction to reduce the transmit power, for $AP_i$ and $AP_j$ (114, 118), if the transmit power for $AP_i$ and/or $AP_j$ have not already been reduced during this analysis loop (112, 116). In one embodiment, coverage analyzer 21 reduces the transmit power of $AP_i$ and $AP_j$ each by 10 dB. As one skilled in the art will recognize, however, the coverage threshold, as well as the amount by which the transmit powers are reduced, can be fully parameterized and configurable by a network administrator. Coverage analyzer 21 repeats this process for all access elements until the entire matrix has been traversed.

FIG. 3 illustrates that the goal of the method described above to ensure that the coverage areas of access elements do not overlap neighboring access elements assigned the same channel. The benefit of adjusting the transmit power only on access elements on the same channel is that the intervening access elements provide coverage between the overlapping access elements and buffer to account for the difference between the pathloss exponent between access elements and the pathloss exponent between access elements and remote client elements. As described below however other transmit power configuration schemes are possible.

FIG. 5, for example, illustrates a method directed to minimize the coverage overlap at a given threshold level between all access elements without regard to assigned channels. Rather, as FIG. 5 illustrates, coverage analyzer 21 can be configured to lower the transmit power of an access element where it overlaps above a threshold number coverage areas associated with other access elements. As with the method illustrated in FIG. 4, coverage analyzer 21 traverses an i×j matrix of signal strengths detected by the access elements. Accordingly, coverage analyzer 21, for each access element ($AP_i$) (202), first determines whether a coverage hole has been detected as to that access element (204). For each access element $AP_j$ (206), coverage analyzer 21 compares the strength of the signal $S_{ji}$, transmitted by $AP_j$ as detected by $AP_i$ (208), and increments a counter, OverlapCount, if Sji exceeds a coverage threshold (e.g., −85 dBm) (210). If the OverlapCount exceeds a threshold value (212), coverage analyzer 21 reduces the transmit power of $AP_i$ (214). Coverage analyzer 21 repeats this process until all access elements in the matrix have been traversed.

B.3. Dynamic Transmit Power With Location Information

As discussed above, the dynamic transmit power functionality may also take location information into account. In one embodiment, the access point table includes positional coordinates of each access element and further includes a z-axis dimension such as floor height or level, which can be configured by a network administrator or determined automatically through known components, such as a Global Positioning System (GPS) receiver. As FIGS. 6A and 6B illustrate, coverage analyzer 21, in one embodiment, first calculates the coverage overlaps relative to all quadrants for each access element, and then adjusts the transmit power for any access element where there is overlap in all for quadrants.

Figure 6A:
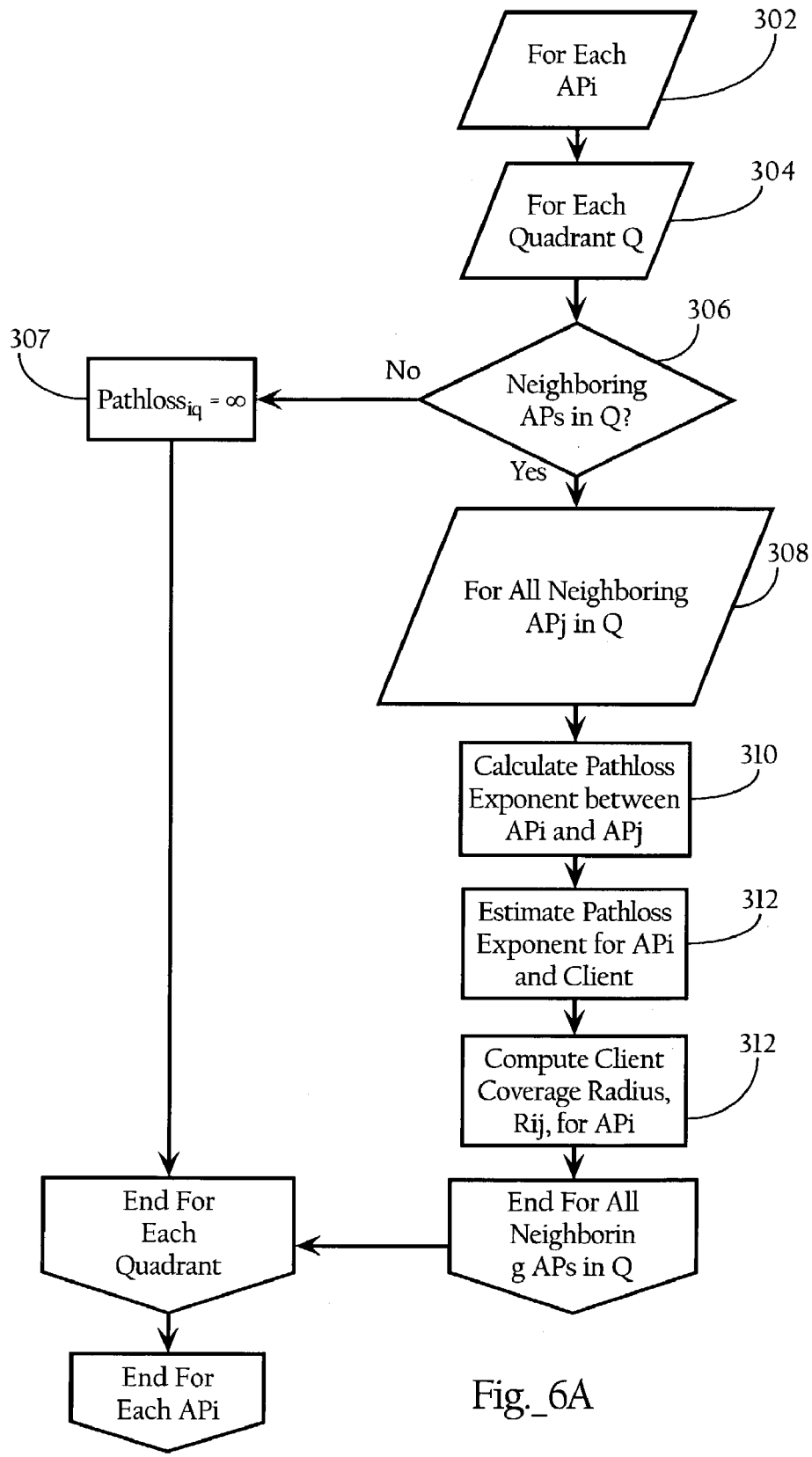

As FIG. 6A shows, coverage analyzer 21, in one embodiment, for all access elements $AP_i$ (302), uses the positional parameters associated with the access elements to determine whether the current access element $AP_i$ includes a neighboring access element within a threshold distance in a given quadrant, Q (304, 306). In one embodiment, a neighboring access element is an access element within a threshold distance and on the same floor as the current access element $AP_i$. If there are no neighboring access points in a given quadrant, pathloss is set to infinity (307), since the quadrant is at the edge of the network, and reducing transmit power just reduces the edge of the network. Otherwise, coverage analyzer 21 computes the pathloss exponent, ExpPLij, between access element $AP_i$ and all neighboring access elements $AP_j$ (308, 310). Equation 1, below, is a pathloss model, where c=the speed of light, f=frequency, and d=distance. Since the pathloss (PL) between a first access element and a second access element is the difference between the transmit power at the first access element and the receive signal strength at the second access element, the pathloss exponent, $ExpPL_{ij}$, can be derived from Equation (1).

$$PL = 10\log\left[\left(\frac{c}{4*f*pi*d}\right)^{ExpPlij}\right] \quad (1)$$

From the pathloss exponent between access elements $AP_i$ and $AP_j$, a pathloss exponent between access element $AP_i$ and a remote client element can be estimated (312). In one embodiment, the estimated client pathloss exponent is derived by multiplying the pathloss exponent between access elements, $ExpPL_{ij}$, by a factor, as illustrated in Equation (2).

$$ExpClient_{ij}=ExpPL_{ij}*Factor \quad (2)$$

The multiplication factor above can be a configurable parameter and/or experimentally determined by comparing signal strengths detected between access elements with concurrent monitoring of the signal strength of access elements with wireless network testing equipment. With the estimated client pathloss exponent, ExpClientij, coverage analyzer 21 then calculates the radius of the coverage area, $R_{ij}$, at a threshold signal strength level (e.g., −85 dBm) (312). In one embodiment, this can be done by solving Equation 1 for distance (d), since all other variables are known.

After all threshold level coverage radii have been computed, coverage analyzer 21, in one embodiment, calculates the coverage overlaps in all quadrants relative to each access element, and adjusts the transmit power where there is overlap in all quadrants. As FIG. 6B illustrates, coverage analyzer computes, for each access element ($AP_i$) (320), the coverage threshold overlap between all neighboring access elements ($AP_j$) in each quadrant relative to each quadrant (322, 324, 326). Equation (3) illustrates how coverage overlap can be computed according to one embodiment of the present invention.

$$O_{ijq}=d_{ij}-(R_{iq}+R_{jq}) \quad (3)$$

The overlap in a given quadrant q between two access elements i and j is the difference between the distance, $d_{ij}$, between the access elements and the sum of their coverage radii, R, at the threshold power level. A negative value indicates no coverage overlap.

As FIG. 6B shows, coverage analyzer 21 determines the lowest computed coverage overlap from the values computed for a given access element (328) and adjusts the transmit power of the access element, $AP_i$, if the minimum computed coverage overlap is a positive value (indicating coverage overlap) (330). In one embodiment, coverage analyzer 21 adjusts the transmit power of the access element, $AP_i$, if the minimum coverage overlap is greater than a threshold value. Coverage analyzer 21 repeats this process for all desired access elements.

The invention has been explained with reference to specific embodiments. Other embodiments will be evident to those of ordinary skill in the art. For example, although embodiments of the present invention have been described as operating in 802.11 wireless networks, the present invention can be applied other wireless network environments implementing alternative networking protocols. Furthermore, the present invention has application to other wireless network environments and implementations. For example, the present invention can be applied to wireless network environments comprising a distributed network of antennas wherein all communication and management functionality is processed at a central control element. It is, therefore, intended that the claims set forth below not be limited to the embodiments described above.

What is claimed is:

1. A system facilitating the dynamic configuration of transmit power in a wireless network environment including a plurality of access points, comprising
   a plurality of access elements for wireless communication with at least one remote client element and for communication with a coverage analyzer, wherein the access elements are each operative, in a coverage scanning mode, to:
receive radio frequency (RF) signals carrying respective wireless frames transmitted by one or more neighboring wireless access elements;
detect the strength of the received RF signals relative to the wireless frames;
gather coverage scan data characterizing the detected strength of the RF signals transmitted by the neighboring access elements, and
transmit the coverage scan data to a coverage analyzer;
a coverage analyzer operative to:
process coverage scan data received from the access elements; and
compute a set of transmit power levels for the access elements based on the detected strength of the RF signals transmitted by the access elements.

2. The system of claim 1 wherein the access elements are each further operative to
establish and maintain, in an access point mode, wireless connections with remote client elements;
switch to a scanning mode for a scanning period at a scanning interval to detect wireless traffic associated with other access elements, and
record coverage scan data characterizing the detected wireless traffic.

3. The system of claim 2 wherein the scanning period is a configurable parameter.

4. The system of claim 2 wherein the scanning interval is a configurable parameter.

5. The system of claim 2 wherein the access element is operative to scan for wireless traffic on a plurality of frequency channels.

6. The system of claim 2 wherein the wireless traffic comprises a plurality of packets; and wherein the access elements are each operative to parse the information in the packets, detect the strength of the signals associated with the packets, and transmit the packet information and associated signal strengths to the coverage analyzer.

7. The system of claim 1 wherein the access elements are each further operative to:
broadcast wireless management packets for detection by other access elements.

8. The system of claim 7 wherein the access elements are further operative to:
detect wireless management packets transmitted by other access elements;
detect the strength of the signal associated with the wireless management packets;
parse information in the wireless management packets; and
transmit the packet information and the associated signal strength to the coverage analyzer.

9. The system of claim 1 wherein the access elements are each operative to
detect the strength of the wireless signals associated with packets transmitted by remote wireless clients;
provide indicators of the strength of the detected wireless signals;
wherein the coverage analyzer is further operative to:
maintain the indicators of the strength of the wireless signals provide by the access elements; and
analyze the indicators of the strength of the wireless signals associated with each access element to determine compliance with a minimum coverage profile,
compute a set of transmit power levels for the access elements based on the coverage scan data and the compliance as to each access element with the minimum coverage profile.

10. A system facilitating the dynamic configuration of transmit power in a wireless network environment including a plurality of access points, comprising
a plurality of access elements for wireless communication with at least one remote client element and for communication with a central control element;
a central control element for supervising said access elements, wherein the central control element is operative to manage wireless connections between the access elements and corresponding remote client elements,
wherein the access elements are each operative to
receive radio frequency (RF) signals carrying respective wireless frames transmitted by one or more neighboring wireless access elements;
detect the strength of the received RF signals relative to the wireless frames;
gather coverage scan data characterizing the detected strength of the RF signals transmitted by the neighboring access elements, and
transmit the coverage scan data to the central control element;
wherein the central control element comprises a coverage analyzer operative to:
process coverage scan data received from the access elements;
compute a set of transmit power levels for the access elements based on the detected strength of the RF signals transmitted by the access elements.

11. The system of claim 10 wherein the central control element is operative to adjust the transmit power of the access elements to implement the computed set of transmit power levels.

12. The system of claim 10 wherein
wherein said access elements are each operative to
receive wireless signals transmitting wireless data packets from the at least one remote client element;
detect strength of the wireless signals,
associate the detected signal strengths with the corresponding data packets,
transmit the packet information and associated signal strengths to the coverage analyzer.

13. The system of claim 10 wherein
wherein said access elements are each operative to
receive wireless signals transmitting wireless data packets from the at least one remote client element;
detect the strength of the wireless signals,
associate the detected signal strengths with the corresponding data packets,
encapsulate the wireless data packets in an encapsulating packet, wherein the encapsulating packet includes the corresponding signal attribute, and
transmit the encapsulating packet to the central control element;
wherein the central control element is operative to decapsulate the encapsulating packets and bridge the wireless data packets to appropriate destination nodes, and
wherein the coverage analyzer comprises
a data collector operative to maintain the signal strengths contained in encapsulating packets in a data structure; and wherein the coverage analyzer is further operative to analyze the signal strengths maintained by the data collector to determine compliance of each access element with a minimum coverage profile, and compute a set of transmit power levels for the access elements based on the coverage scan data and the compliance as to each access element with the minimum coverage profile.

14. A coverage analyzer comprising a coverage analysis module operative to gather coverage scan data from a plurality of access elements characterizing the strength of the signals transmitted by neighboring access elements; receive, from the access elements, indicators of the strength of the wireless signals associated with packets transmitted by remote wireless clients; analyze the indicators of the strength of the wireless signals associated with each access elements to determine compliance with a minimum coverage profile; process coverage scan data received from the access elements; and compute a set of transmit power levels for the plurality of access elements based on the coverage scan data and the compliance as to each access element with the minimum coverage profile;

process coverage scan data received from the access elements; and compute a set of transmit power levels for the plurality of access elements based on the coverage scan data.

\* \* \* \* \*